United States Patent [19]

Sugg et al.

[11] Patent Number: 4,738,137

[45] Date of Patent: Apr. 19, 1988

[54] ACOUSTIC EMISSION FREQUENCY DISCRIMINATION

[75] Inventors: Frank E. Sugg, Westminster; Lloyd J. Graham, Newbury Park, both of Calif.

[73] Assignee: The United States of America as represented by the Administrator, National Aeronautics and Space Administration, Washington, D.C.

[21] Appl. No.: 874,319

[22] Filed: Jun. 12, 1986

[51] Int. Cl.$^4$ .............................................. G01H 1/00
[52] U.S. Cl. ........................................ 73/587; 73/801
[58] Field of Search ................ 73/587, 801, 658, 602, 73/659; 340/683, 566; 364/507

[56] References Cited

U.S. PATENT DOCUMENTS

| | | | |
|---|---|---|---|
| 3,614,724 | 10/1971 | Brown et al. .................... | 340/16 R |
| 3,793,627 | 2/1974 | Darrel et al. ....................... | 340/683 |
| 3,858,439 | 1/1975 | Nakamura ............................. | 73/71.4 |
| 3,919,883 | 11/1975 | Nakamura et al. ................. | 73/71.4 |
| 3,924,456 | 12/1975 | Vahaviolos ......................... | 73/587 |
| 3,985,024 | 10/1976 | Horak .................................. | 73/71.4 |
| 4,091,660 | 5/1978 | Yanagi ................................. | 73/658 |
| 4,134,109 | 1/1979 | McCormick et al. ............. | 340/550 |
| 4,317,368 | 3/1982 | McElroy ............................. | 73/587 |
| 4,656,868 | 4/1987 | Azuma et al. ........................ | 73/587 |

Primary Examiner—John Chapman
Attorney, Agent, or Firm—Russell E. Schlorff; John R. Manning; Edward K. Fein

[57] ABSTRACT

In acoustic emission non-destructive testing, broadband frequency noise is distinguished from narrow band acoustic emission signals, wherein the latter are valid events indicative of structural flaws in the material being examined. This is accomplished by separating out those signals which contain frequency components both within and beyond (either above or below) the range of valid acoustic emission events.

6 Claims, 1 Drawing Sheet

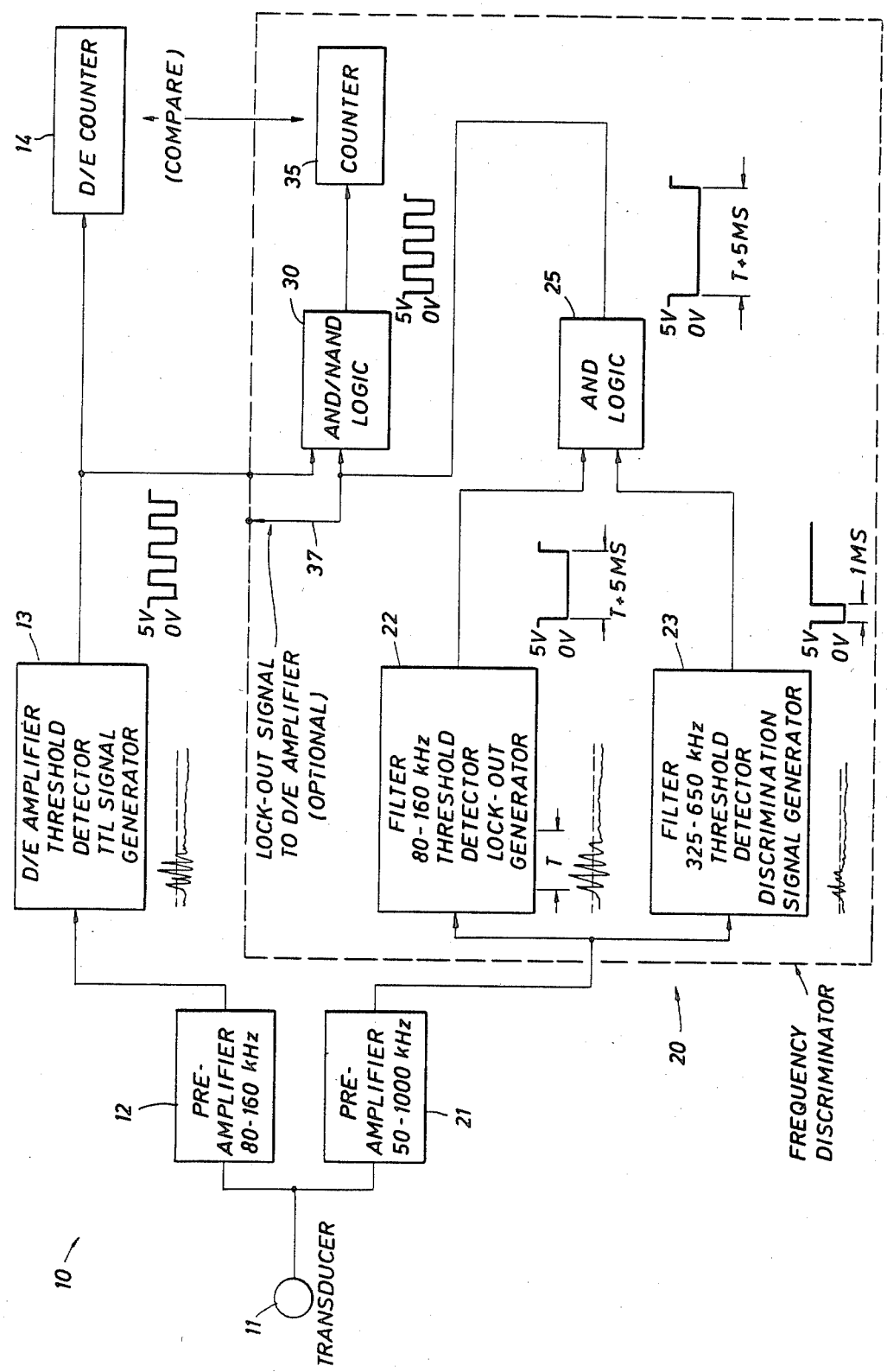

ACOUSTIC EMISSION FREQUENCY DISCRIMINATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to various methods and apparatus for testing materials, machinery, and so forth. More particularly it relates to non-destructive testing techniques, and especially to non-destructive testing in which acoustic emissions of bodies under test are detected and analyzed.

Detection and analysis of acoustic emissions have become an important tool in non-destructive testing. A respectable body of knowledge, expertise, and methodology has developed in this area due to the very important advantages which obtain in certain testing situations. U.S. Pat. No. 3,985,024, issued Oct. 12, 1976 (Horak), for example, discloses three such acoustic emission processes. More particularly, the patent is directed to an acoustic emission process which rejects unwanted signals by means of three methods used either independently or in conjunction. In the first, a master-slave arrangement is used in which any signal received by an external slave transducer before it is received by a master transducer is rejected. Second, rise time discrimination, which allows only signals which satisfy certain wave form requirements to be counted, is employed. The third method used discriminates among signals received by the master transducers on the basis of whether they occur coincidently within a selected time frame.

Similarly, U.S. Pat. No. 3,858,439, issued Jan. 7, 1975 (Nakamura), is directed to a master-slave arrangement in which signals are accepted only if they reach the master sensors before they reach the slave sensors. Frequency filters are also provided to exclude signals outside the desired frequency range, thereby excluding background noise.

U.S. Pat. No. 3,919,883, issued Nov. 18, 1975 (Nakamura), monitors the rate of amplitude build-up of the acoustic signals, and selects only acoustic signals which have a selected build-up rate.

Similar methods for analyzing acoustic patterns have been applied, for example, to detecting glass breakage. In U.S. Pat. No. 4,091,660, issued May 30, 1978 (Yanagi), for example, there is disclosed a method for detecting breaking glass by identifying the simultaneous production of a low frequency ($<50$ kHz) component and a high frequency ($>100$ kHz) component. The output of a piezoelectric element mounted on a glass plate is first passed through a low pass filter and a parallel high frequency resonant circuit. The two signals are then applied to a gate circuit so that an output signal is produced only when the levels of both frequency components are above their respective predetermined levels.

U.S. Pat. No. 4,134,109, issued Jan. 9, 1979 (McCormick et al), discloses an alarm system responsive to the breaking of glass. The system compensates for the level of background noise by analyzing acoustic signal strength, frequency content, and signal pattern. In one part of the system the signal is supplied to narrow bandpass filters tuned to pass four different acoustic frequencies. Each filter output is supplied to a corresponding waveform integrator and comparator so that output signals are generated only when the corresponding filter signal exceeds a threshold level. A further output signal is generated only when the majority of the frequency bands exceeds the threshold level.

U.S. Pat. No. 3,614,724, issued Oct. 19, 1971 (Brown et al), discloses a means for detecting man-associated disturbances and distinguishing them from background noise by passing seismic signals through a series of frequency band pass filter-amplitude detector combinations connected in parallel. The detector outputs are processed so that signal pulses are generated only when the amplitude of the input to one pass band is greater than a certain level above that of the other pass bands.

U.S. Pat. No. 4,317,368, issued Mar. 2, 1982 (McElroy), discloses an acoustic emission warning system which detects glass fiber breakage in fiberglass members. Acoustic signals are first amplified and filtered by one network, and then rectified and demodulated to produce a representative envelope. These envelopes are then passed in parallel through high and low threshold stages, each comprising a comparator amplifier which receives a constant preset voltage tapped from a potentiometer. The threshold stage outputs are then sent through a three part logic network which identifies the wave envelope. If the envelope corresponds to glass fiber breakage it is counted. An alarm is activated if the count frequency exceeds a preset level.

Clearly, a variety of non-destructive acoustic emission testing methods and techniques, as well as acoustical analysis methods for other applications, is thus present in the literature. However, none of these publications provides a direct adjunct facility which can generate, as desired, companion data furnishing accept or reject criteria for deciding, on a reported-event by reported-event basis, the validity of each particular event as it is accepted as such by an existing, "standard" acoustic emission detector. (By "standard" is meant a conventional, "off-the-shelf", state-of-the-art detector, such as a Dunegan/Endevco (D/E) Basic Acoustic Emission Instrument with Model No. 1801-110B Preamplifiers and Model No. 1801-50H Frequency Discriminator Preamplifiers, available from Physical Acoustics/Dunegan Corp.) A need therefore remains for such an adjunct event discriminator for further refining and characterizing the data generated by such standard acoustic emission detectors.

Even more generally, as discussed further below, it has been discovered that in acoustic emission non-destructive testing (as distinguished from target destructive events such as glass breakage), there can be important frequency-dependent means for identifying valid events which are indicative of structural flaws in the material being examined, and distinguishing these from mere noise. This is an important distinction from the above-noted patents which use frequency discrimination techniques, for example, for detecting actual breakage of glass materials.

A specific example of a particularly effective application of such a technique may be found in the testing of the thermal protection system tiles of the Space Shuttle. Usually the transducer and a frequency bandpass are selected to detect signals in a frequency range such as 80-160 kHz and reject others containing energy only outside this range. This is a known prior art technique. However, when the tiles are being tested, there are other possible sources of noise which are broadband in frequency, and which can be generated by (1) tile rubbing on an adjacent tile, (2) grit under the vacuum chuck, (3) vacuum leaks, or (4) rubbing of the tile coating crack faces. The novel frequency discriminator according to the present invention provides a method and apparatus for determining if these other types of broadband extraneous noises occur during a test.

Of course, it will also become apparent that valuable applications of the present invention can be made in many other acoustic emission non-destructive testing applications as well.

A need therefore also remains for a frequency-dependent means for identifying valid acoustic emission events during non-destructive testing which are in fact indicative of structural flaws in the material being examined, and for distinguishing these from mere noise.

SUMMARY OF THE INVENTION

Briefly, the present invention meets the above needs and purposes with an acoustic emission frequency discriminator particularly well suited for sensitive and accurate use in non-destructive acoustic emission testing. According to the present invention, in one embodiment an adjunct acoustic emission frequency discriminator is provided for use in conjunction with a prior art acoustic emission detector during non-destructive testing, for characterizing the events reported by the acoustic emission detector. The acoustic emission frequency discriminator includes detecting means for detecting acoustic emission events (which may be the existing transducer on the prior art acoustic emission detector), discrimination means coupled to the detecting means for distinguishing between events having a predetermined broad-band frequency characteristic and events having a predetermined narrow-band frequency characteristic, and output means coupled to the acoustic emission detector and the discrimination means for selectively reporting each event which is detected by the acoustic emission detector and simultaneously determined by the discrimination means as having at least one of these characteristics.

The acoustic emission frequency discriminator of the present invention thus distinguishes between (1) broadband frequency "noise", and (2) relatively narrow-banded acoustic emission signals indicative of structural flaws in materials being examined for such flaws. This is accomplished by separating out those signals which contain frequency components which are beyond (either above and/or below) the frequency range of valid acoustic emission events.

In the frequency discriminator, the acoustic emission signal is first passed through a preamplifier and through two parallel filters, one high frequency and one low frequency. When the amplitude of the signal passing through either of these filters exceeds a certain threshold level, an output signal is produced. The outputs from both signal generators are supplied to logic circuitry which produces a lockout signal (which thus corresponds to invalid events) only if signals from both frequency bands are present simultaneously. A second logic circuit, coupled to receive the normal output count signals from a standard acoustic emission detector, then processes these signals to produce counts according to the lockout signal. Either valid acoustic emission events or invalid events may be selected and tallied, and these then compared with the simultaneously tallied standard count.

In one sense, therefore, the present invention provides an acoustic emission signal processor that selectively sorts acoustic signals on the basis of frequency content, rather than just the frequency. The processor allows rejection of some signals having a particular frequency content, or can provide for separate counting or other processing of these signals.

An especially important feature of the invention is thus its ability to monitor (and recall or record) a wide range of segments of the whole ultrasonic spectrum. This permits examination of the rejected signals, as well as the accepted signals, for complete analysis of structural degradation during testing.

It is therefore an object of the present invention to provide an acoustic emission frequency discriminator and method for use in non-destructive testing; such a discriminator and method which include detecting means for detecting acoustic emission events; which include discrimination means coupled to the detecting means for distinguishing between events having a predetermined broad-band frequency characteristic and events having a predetermined narrow-band frequency characteristic; which include output means for selectively reporting substantially each event having at least one of these characteristics; and to accomplish the above objects and purposes in an inexpensive, uncomplicated, durable, versatile, and reliable method and apparatus, inexpensive to manufacture, and readily suited to the widest possible utilization in acoustic emission non-destructive testing.

These and other objects and advantages of the invention will be apparent from the following description, the accompanying drawings, and the appended claims.

BRIEF DESCRIPTION OF THE DRAWING

The drawing FIGURE is a functional block diagram of a preferred embodiment of the acoustic emission frequency discriminator.

DESCRIPTION OF THE PREFERRED EMBODIMENT

With reference to the drawing, the new and improved acoustic emission frequency discriminator, and the method therefor according to the present invention, will be described. The top portion of the drawing FIGURE shows a prior art acoustic emission detector system 10 used in connection with non-destructive testing. System 10 includes a transducer 11, 80–160 kHz preamplifier 12, a combined amplifier-threshold detector TTL (transistor-transistor logic) signal detector 13, and a counter 14. Also shown is a preferred embodiment 20 of a frequency discriminator according to the present invention. Discriminator 20 includes a broad band 50–1000 kHz preamplifier 21, a combined 80–160 kHz filter-threshold detector lockout generator 22, a combined 325–650 kHz filter-threshold detector discrimination signal generator 23, a first AND logic circuit 25, a second AND/NAND logic circuit 30, a counter 35, and an optional suppress or disable line 37. These components and their interactive functions will be described in greater detail below.

As suggested above, the present invention provides a new method and apparatus that enhance the discriminatory capability of an otherwise standard acoustic emission monitoring system. Its principle of operation relies on the fact that the extraneous noise, which is sometimes superimposed on the "signals" (80–160 kHz, for example) to be detected, has frequency contents extending beyond the upper frequency limit (in the preferred embodiment) of 160 kHz. By setting up a parallel preamplifier of a broader frequency band (for example, 50–1000 kHz) and judicially selecting the frequency threshold levels, the present invention is able to discriminate the signal from the noise. Although the preferred embodiment is described in connection with checking the integrity of the thermal tiles on the Space Shuttle, its principle of operation has broad application to many other non-destructive testing methods and apparatus as well.

In a common prior art technique, the transducer and a frequency bandpass are selected to detect signals in a frequency range such as 80–160 kHz and reject others containing energy only outside this range. However, there are other possible sources of noise which are broadband in frequency, such as that generated by (1) tile rubbing on an adjacent tile, (2) grit under the vacuum chuck, (3) vacuum leaks, or (4) rubbing of the tile coating crack faces. The present invention provides a means of determining if these other types of broadband extraneous noises occur during a test. The invention is designed to provide a quantitative measure of the total acoustic emission counts which are due to invalid extraneous noise sources or to provide a quantitative measure of only the valid acoustic emission counts depending on mode selected. As an option, the frequency discriminator can control the basic acoustic emission instrumentation so that it registers only the counts from valid acoustic emission events.

With particular reference now to the drawing FIGURE, a preferred embodiment of the present invention will be discussed in connection with acoustic emission monitoring during non-destructive bond verification and proof loading of undensified tiles on the Space Shuttle Orbiter. Use of the frequency discriminator during this testing facilitates interpretation of the proof testing results, thereby providing a significant reduction in the rejection of good tiles due to recording of non-relevant signals.

Laboratory testing indicated that extraneous noises generated during proof loading of an Orbiter tile that were not associated with the onset of the tile bond line failure (e.g., vacuum leaks, tiles rubbing, tile coating cracks, vacuum seal rubbing) could be discriminated against and rejected from the acoustic emission counts. It was thus demonstrated that false indications of weak bond lines due to these extraneous noises could be avoided during proof loading of tiles on the Space Shuttle Orbiter.

More specifically, acoustic emission monitoring is done during mechanical proof testing of the Space Shuttle thermal protection system tiles to assure that the tile or tile bondline was not damaged during the testing. The acoustic emission transducers are acoustically coupled at the corners of the top of the 6 in.×6 in. or the 8 in.×8 in. tile while the proof stress is applied by a vacuum chuck which grips about 95% of the top surface area (all but the corners). The acoustic attenuation in the tile material has a very strong frequency dependence so that broadband (0–1 MHz) acoustic emission events which are generated at the bondline on the back surface of the 0.5 in. to 4.5 in. thick tiles contain significant energy only below 200 kHz after propagating through the tile to the acoustic emission transducer locations. The transducers and the frequency bandpass of the preamplifiers were thus selected to detect these signals in the 80–160 kHz frequency range and to reject others containing energy only outside of this range, such as airborne noise due to nearby mechanical impacts, speech, jingling keys, etc.

The other possible sources of acoustic noise containing energy within the 80–160 kHz frequency range, mentioned above (tile rubbing on a neighboring tile, grit under the vacuum chuck, vacuum leaks, and rubbing of the tile coating crack faces), all produce broadband acoustic signals. One way to discriminate against these extraneous noises lies in the fact that their sources are all on the thin glassy coating which covers the top and sides of the tiles. The tile coating material has considerably smaller frequency dependence in its attenuating properties, and this, coupled with the physical nearness of the extraneous noise sources mentioned above, results in appreciable energy well above 200 kHz in these acoustic signals after propagating through the tile coating to the closest acoustic emission transducer.

Frequency discrimination, therefore, provides an excellent means for determining if these types of extraneous noises did occur during a test. The instrumentation developed to do this is designed to provide a quantitative measure of the total acoustic emission counts which are due to invalid extraneous noise sources or to provide a quantitative measure of only the valid acoustic emission counts. As an option, the frequency discriminator can control the basic acoustic emission instrument so that it registers only the counts from valid acoustic emission events.

In the preferred embodiment, at the input to the frequency discriminator 20 there is an internally adjustable variable gain amplifier (not shown) which buffers and amplifies the signal and passes it to two parallel filters. If the acoustic emission signal, after passing through the high frequency filter 23 (325–650 kHz bandpass) has an amplitude which exceeds a predetermined high frequency threshold level, then a discrimination signal is generated which is a 5 v pulse with a 1 millisecond (ms) duration. High frequency threshold levels can be varied, of course, to compensate for tile thickness. That is, when very thin tiles are tested a small amount of high frequency signal in the valid acoustic emission events can get through to the acoustic emission transducer and the threshold level must be raised so that they are not rejected.

The output of the low frequency (80–160 kHz) filter in the filter/generator 22 passes to a low frequency threshold level detector therein which is preset (by internal adjustments) to about 1 dB above the electronic noise level. This assures that every acoustic emission signal, detected by the basic instrumentation 10, which typically has a detection level about 8 dB above the electronic noise, is also detected by the low frequency circuitry in the frequency discriminator. When this occurs a lockout signal is generated which, in the preferred embodiment, is a 5 v pulse with a duration equal to the duration of the acoustic signal plus 5 ms.

The outputs from both the discrimination signal generator 23 and the lockout signal generator 22 are supplied to first logic level circuitry 25 which presents the lockout signal at its output only if both signals are present simultaneously at its input. This only occurs if the detected acoustic emission signal has both low frequency and high frequency components, and, as described, is thus considered to be an indication of an invalid event.

When the lockout signal passes through the first logic level 25 it is supplied to the input of a second logic circuit 30 along with the train of counting pulses generated by the TTL signal generator 13 in the basic instrumentation 10. These counting pulses are obtained by tapping off the signals supplied to the counters of the basic instrumentation 10. The operation of the second level of logic circuitry 30 may be controlled, for example, by a reject/accept selector switch (not shown). When the switch is in the reject position, the second level logic circuit 30 operates in the AND mode and passes the counting pulses of the acoustic emission detector 10 to the frequency discriminator counter 35 only when the lockout signal from circuit 25 is also present at the input to circuit 30. In this (reject) mode the counts due to just the invalid events are accumulated on the frequency discriminator counter 35 for comparison with the total counts accumulated on the counter 14 of the basic instrumentation 10 at the completion of a test. When the switch is toggled to the other (accept) position, the NAND mode is selected and the counting pulses are passed to the frequency discriminator counter 35 only when the lockout signal is not present at the input to the logic circuit 30. In this mode just the counts due to valid events are accumulated, thereby indicating the degree of the damage directly. As an option, the lockout signal at the output of the first logic level circuitry 25 can be supplied on the optional suppress line 37 to the basic instrumentation 10 to disable the TTL signal generator 13 while the lockout signal is present, so that only valid events are counted. This lockout option will work equally well for a short duration pulse or a quasi-steady state signal, such as from a vacuum leak. In either case the lockout signal will remain on for a time equal to the duration of the signal, T, plus 5 ms.

As may be seen, therefore, the present invention has numerous advantages. For example, the frequency discrimination circuitry and logic can be used in acoustic emission applications where signals of interest are narrow-banded, and extraneous signals are broad-banded, or vice versa. The present invention thus has particular utility in acoustic emission testing applications where discrimination of broad-banded from narrow-banded signals (and vice versa) is required. The invention readily detects anomalies and flaws where conventional methods of signal discrimination are unsuccessful. The invention is thus versatile, sensitive, economical, and readily suited to widespread use in a great variety of such non-destructive acoustic emission testing applications.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. Apparatus for non-destructive acoustic emission testing of thermal protection tiles on a spacecraft, comprising:

(a) a transducer for detecting acoustic signals in such a tile,
    (b) a narrow band amplifier, threshold detector, TTL signal generator, and counter coupled to said transducer for detecting and counting signals in substantially the 80-160 kHz frequency range,
    (c) a broad-band amplifier coupled to said transducer for amplifying signals in substantially the 50-1000 kHz range,
    (d) a narrow band low frequency filter/threshold detector lock-out generator connected to said broad-band amplifier for generating a lock-out signal upon detecting an acoustic signal having a predetermined threshold level in substantially the 80-160 kHz range,
    (e) a narrow band high frequency filter/threshold detector discrimination signal generator connected to said broad-band amplifier for generating a discrimination signal upon detecting an acoustic signal having a predetermined threshold level in substantially the 325-650 kHz range,
    (f) a first level logic circuit connected to said narrow band low frequency filter/threshold detector lock-out generator and to said narrow band high frequency filter/threshold detector discrimination signal generator for providing an output only if signals from both said generators which are connected thereto are present substantially simultaneously at the input to said first logic level circuit,
    (g) a second level logic circuit connected to the output of said first level logic circuit and to the output of said TTL signal generator and selectively operable in either the AND or the NAND mode, the former providing outputs corresponding to invalid acoustic events, and the latter providing outputs corresponding to valid acoustic events, and
    (h) output means for reporting substantially each of said second level logic circuit outputs.

2. A method for non-destructive acoustic emission testing of thermal protection tiles on a spacecraft, comprising:

(a) detecting acoustic signals in such a tile,
    (b) detecting and counting signals in substantially the 80-160 kHz frequency range using a narrow band amplifier, threshold detector, TTL signal generator, and a counter coupled to the transducer,
    (c) amplifying signals in substantially the 50-1000 kHz range using a broad-band amplifier,
    (d) by using a narrow band low frequency filter/threshold detector lock-out generator connected to the broad-band amplifier, generating a lock-out signal upon detecting an acoustic signal having a predetermined threshold level in substantially the 80-160 kHz range,
    (e) by using a narrow band high frequency filter/threshold detector discrimination signal generator connected to the broad-band amplifier, generating a discrimination signal upon detecting an acoustic signal having a predetermined threshold level in substantially the 325-650 kHz range,
    (f) by using a first level logic circuit connected to the narrow band low frequency filter/threshold detector lock-out generator and to the narrow band high frequency filter/threshold detector discrimination signal generator, providing an output only if signals from both the generators which are connected thereto are present substantially simultaneously at the input to the first logic level circuit,
    (g) by using a second level logic circuit connected to the output of the first level logic circuit and to the output of the TTL signal generator and selectively operable in either the AND or the NAND mode, providing outputs corresponding to invalid acoustic events when operating in the AND mode, and providing outputs corresponding to valid acoustic events when operating in the NAND mode, and (h) reporting substantially each of the second level logic circuit outputs.

3. An acoustic emission frequency discriminator for use in non-destructive testing, comprising:

(a) detecting means for detecting acoustic emission events, (b) discrimination means coupled to said detecting means for distinguishing between events having a predetermined broad-band frequency characteristic and events having a predetermined narrow-band frequency characteristic, and said discrimination means including a low frequency bandpass filter/detector and a high frequency bandpass filter/detector, and logic circuit means connecting said filter/detectors for reporting a narrow-band frequency event when only one of said filter/detectors detect an event at a particular time, and (c) output means for reporting such events.

4. The discriminator of claim 3 wherein said output means also includes a counter for counting said detected acoustic events.

5. A method for non-destructive acoustic emission frequency discriminator testing, comprising:

(a) detecting acoustic emission events, (b) discriminating and distinguishing between events having a predetermined broad-band frequency characteristic and events having a predetermined narrow-band frequency characteristic, wherein said discriminating step includes discriminating by using a low frequency bandpass filter/detector and a high frequency bandpass filter/detector connected to a logic circuit for reporting a narrow-band frequency event when only one of said filter/detectors detects an event at a particular time, and (c) reporting each narrow-band frequency event.

6. The method of claim 5 wherein said reporting step further comprises counting said detected acoustic emission events.

* * * * *